United States Patent [19]

Bittner et al.

[11] 4,225,331
[45] Sep. 30, 1980

[54] METHOD OF AND APPARATUS FOR PRODUCING GLASS VESSELS

[75] Inventors: Hans-Joachim Bittner; Heribert Scherer; Hans Hanses, all of Hagen, Fed. Rep. of Germany

[73] Assignee: H. Putsch GmbH & Company, Fed. Rep. of Germany

[21] Appl. No.: 28,441

[22] Filed: Apr. 9, 1979

[30] Foreign Application Priority Data

Apr. 17, 1978 [DE] Fed. Rep. of Germany ....... 2816649

[51] Int. Cl.³ .................. C03B 7/16; C03B 11/02; C03B 19/00

[52] U.S. Cl. .................................. 65/48; 65/76; 65/156; 65/224; 65/225; 65/226; 65/227; 65/309; 264/250; 425/324.1

[58] Field of Search .................. 65/47, 48, 76, 156, 65/223, 224, 225, 226, 227, 309; 264/250; 425/324.1

[56] References Cited

U.S. PATENT DOCUMENTS

| | | | |
|---|---|---|---|
| 2,327,825 | 8/1943 | Schutz | 65/156 X |
| 3,180,717 | 4/1965 | Treece | 65/48 |
| 3,453,096 | 7/1969 | Benard et al. | 65/156 X |
| 3,955,954 | 5/1976 | Ilk | 65/156 X |

FOREIGN PATENT DOCUMENTS 2632125  8/1977  Fed. Rep. of Germany .
 897022  3/1945  France ......................................... 65/47

*Primary Examiner*—Richard V. Fisher
*Attorney, Agent, or Firm*—Shapiro and Shapiro

[57] ABSTRACT

In the production of a glass vessel (such as a goblet) comprising a receptacle part (e.g. a goblet bowl) and a stand part (e.g. a stem with a base plate), the receptacle part is formed by pressing in successive moulds carried by a rotary table and the stand part is formed by injection moulding, being simultaneously united to the receptacle part. In carrying the invention into effect the mould for the receptacle part is charged from a feeder in free drop fall; the table is then rotated to bring the pressed receptacle part into register with an injection mould for the stand part, and an injection device, of which the injection mould forms part, is charged from the same feeder by way of a drop guide channel.

9 Claims, 4 Drawing Figures

METHOD OF AND APPARATUS FOR PRODUCING GLASS VESSELS

BACKGROUND OF THE INVENTION

The present invention relates to a method of producing a glass vessel consisting of a receptacle part and a stand part, more especially but not exclusively for producing a goblet glass consisting of a goblet bowl and a stem with base plate, in which the receptacle part is produced on a rotary table in a pressing operation and subsequently the stand part is formed by an injection device and in so doing is united with the receptacle part.

In a conventional manner of producing glass vessels consisting of a receptacle part (e.g. a goblet bowl part) and a stand part (e.g. a stem with base plate), the receptacle part produced in a separate production process is inserted, usually manually, into an injection machine in which, then, in a second operation, the stand part is formed and is united with the receptacle part. The advantage of this procedure is that high quality glass vessels can be produced. On the other hand, it has the disadvantage that the essential operative steps, some of which are manual, continuous cyclic production can be achieved only with difficulty, and quantity production cannot be achieved.

To avoid these disadvantages, a procedure is already known in which the receptacle parts are produced in a first machine and are transported, by a transfer device, to a second machine, in which the stand parts are produced in a direct pressing process and are pressed onto the receptacle parts. A procedure of this kind is relatively complicated and therefore expensive and susceptible to trouble, since the transfer device has to grasp the pressed receptacle part produced in a press mould in the first machine, lift it out of the press mould, turn it and transport it to the second machine, and then has to set it down, after centring, under a press mould for the stand-part, by means of an upwards movement in the second machine. In addition to this, because two machines are involved, this procedure requires two feeders, so that two work positions have to be available at the glass supply tank. In addition to this, only a feeder which operates very precisely can be used to feed the second machine in which the stand parts are pressed directly onto the receptacle parts, since in this procedure only very small glass weights can be processed, and in addition the fed quantities have to be very constant as to weight. This weight constancy is necessary because during the pressing operation only a very slight pressing-in depth is available in the base plate. Such a precisely-operating feeder is very expensive, since in practice it has to be equipped with a platinum lining.

An object of the present invention is to provide a completely novel method with which high quality glass vessels can be produced in a cost-favourable manner, with a small space requirement with the minimum of mechanical equipment.

BRIEF STATEMENT OF INVENTION

In accordance with the invention, this aim is achieved in that a mould for the receptacle part is charged in free drop fall by a glass feeder, and in that the receptacle part, after pressing and cooling, is transported onto an injection mould for the stand part, which injection mould is integrated into the rotary table for the receptacle part, and in that the injection device for the stand part is charged from the glass feeder by way of a drop guide channel.

As a result of adoption of the features of the invention, a process is achieved in which the entire glass vessel can be produced in a single machine, which results in the abolition of a considerable number of component parts, which would be necessary with the second machine in the arrangement of the prior proposal, as well as elimination of the complicated and expensive transfer device. Additionally, with the method in accordance with the invention, only a single feeder is necessary for charging, whereby the space requirement can be reduced to one work station at the glass supply tank. Also, operation of the method of the invention requires only one team.

In an advantageous development of the method of the invention, the drop fall for the receptacle part is effected at the end of a standstill phase of the rotary table for the pressing and injecting process, and charging of the injection device via the drop guide channel is effected at the start of this standstill phase. By proceding in this way, the result is achieved that the drop for the receptacle part has minimum contact time with the surrounding mould, prior to the pressing, after the following switching phase of the rotary table, while the drop for the stand part can, without disadvantage, be supplied to the injection device one drop phase earlier. This latter drop indeed necessarily experiences a cooling down at its outer skin. However, this cooling down can be accepted, since during the injecting of the stand part, only the hot glass from the interior of the drop enters into the injection mould, whilst the cooled skin remains in the glass residue.

In a preferred procedure, in the course of the first two revolutions of the rotary table, the receptacle part is produced, cooled down and brought over the injection mould for the forming and uniting therewith of the stand part. Then, in the course of further two revolutions of the rotary table, the stand part is moulded on and cooled down, and the glass vessel is removed. Such a procedure has, inter alia, the advantage that running can be effected with a relatively high speed and the diameter of the rotary table can be kept relatively small.

In accordance with an advantageous further development of the method, the injection mould for the stand part is arranged on the rotary table outside the press mould for the receptacle part, and is charged by way of a collecting vessel, arranged radially outside the injection mould and swingable under the injection mould, for the glass gob. As a result of this, short transposition and feeding paths can be achieved.

Another object of the present invention is, furthermore, to provide a technically-simple-constructed, operationally-reliable and space-saving device for carrying out the method in accordance with the invention.

Starting from a device, with a rotary table having press moulds, adapted to be charged in free drop fall from a glass feeder for the production of the receptacle parts, this object is achieved, in accordance with the invention, in that injection moulds for the stand parts are arranged on the rotary table beside the press moulds for the receptacle parts, and in that at least two collecting vessels are provided in the region of a feed station, each said collecting receptacle having an injection plunger, which plungers are coupled to one another and which, after charging with injection-mould glass gobs, can be swung under the successive injection moulds.

As a result of these features of the invention, an apparatus is provided in which the collecting receptacle, just charged with an injection-mould glass gob, is swung, simultaneously with movement of the rotary table into its next subsequent position, under the arriving injection mould, so that the subsequent standstill time is available in its entirety for the step of injection moulding the stand part.

In a preferred embodiment of the apparatus the injection mould is arranged at a small spacing radially beside the respective press mould outside the edge of the rotary table. With this arrangement, the collecting receptacles can be swung unimpeded under the injection mould. Furthermore, upon the transposing of the receptacle part, from the press mould, over the injection mould, only a relatively small movement path has to be transversed.

It is, moreover, advantageous that the collecting receptacles should be arranged at a small spacing on a rotary plate. As a result of this measure, the spacing between the collecting receptacle and the press mould in the feed position is relatively small, so that a short feed path via the drop guide channel can be achieved.

In a preferred embodiment, the rotary table is raisable and lowerable and is adapted to be brought into engagement with a spur toothing which is arranged on its underside. In this way, not only can the rotary table be centred in its respective indexing positions, but in addition to this, also, the respective collecting receptacle with the injection mould thereabove can be centred to form a moulding unit necessary for the injection process.

In an advantageous further development of the apparatus, arranged on the underside of the injection mould is an unsplit ring which encloses a receiving chamber and which can be engaged by its underside sealingly with the upper edge of the collecting vessel. This receiving space is of such dimensions that it can fully accommodate the residual glass tablet which accrues from the injection process, so that upon the subsequent lifting off and swinging away of the rotary table the reception space of the receiving container is free for renewed charging with a glass gob for the injection mould.

BRIEF DESCRIPTION OF THE DRAWINGS

The invention will be described further, by way of example, with reference to the accompanying drawings, in which.

DESCRIPTION OF THE ILLUSTRATED EMBODIMENT

Figure 1:
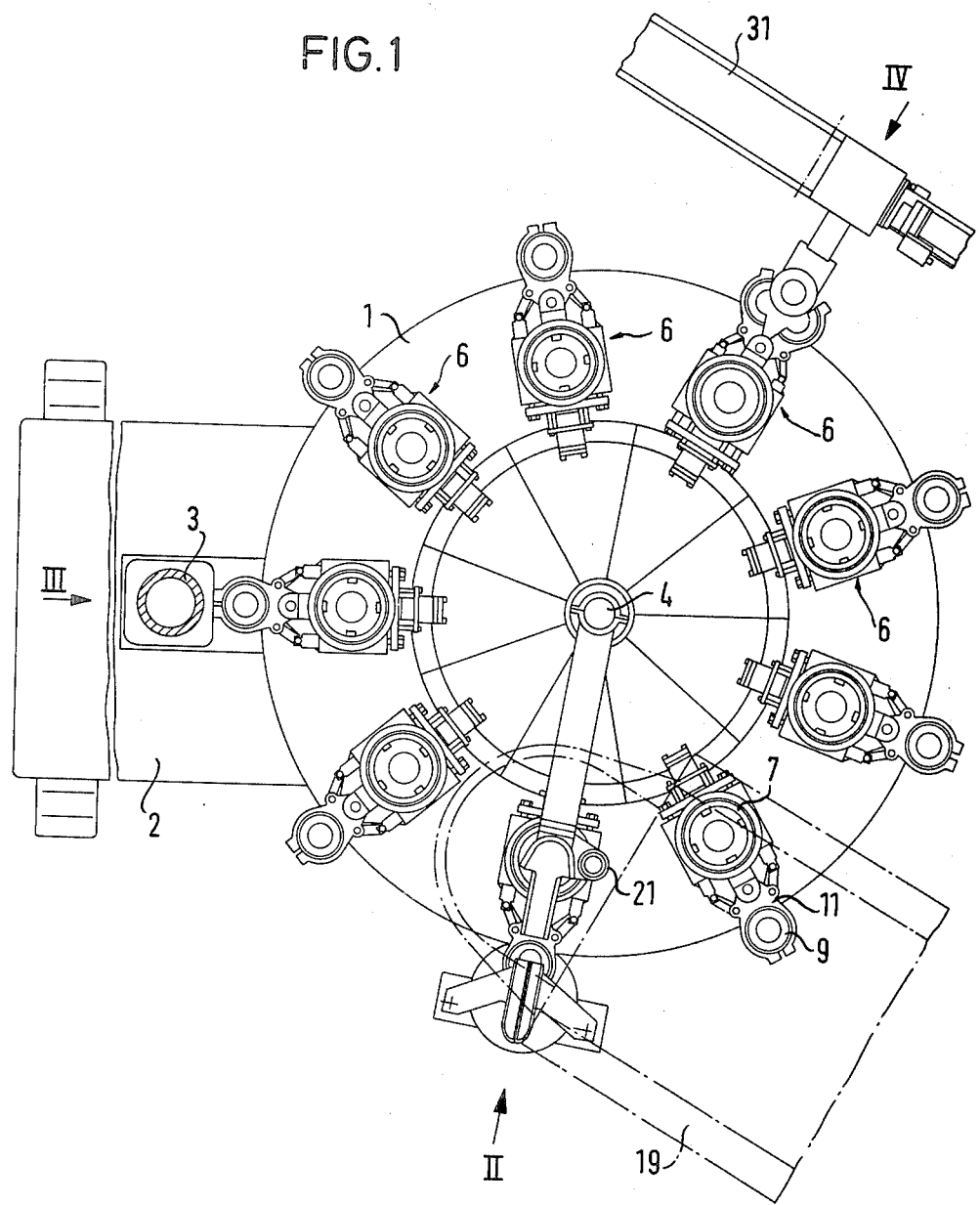
FIG. 1 is a general plan view of a preferred embodiment of the apparatus of the invention.

As is apparent from the various figures of the drawings the illustrated embodiment of the apparatus of the invention comprises a rotary table 1 which is mounted on a machine bed 2. Arranged beside the rotary table 1, on the machine bed 2, is a guide column 3. Through the centre of the rotary table 1 there extends a centre column 4 which is similarly fastened to the machine bed 2. The guide column 3 and the centre column 4 are connected together at their upper ends by a press traverse 5 which is mounted so as to be adjustable in height on the columns for adaptation to different mould heights.

In the present exemplified embodiment, arranged on the rotary table 1, at a relative angular spacing of 40°, are nine moulding units 6, each of which is designed as a press mould 7 for producing a receptacle part 8 and an injection mould 9 for producing a stand part 10. In the present exemplified embodiment, also, the press mould 7 is designed as a segmented mould. Depending on the type or shape of receptacle part that is to be produced, however, unsplit moulds can alternatively be used. The injection moulds 9 are designed as hinged moulds which are received by mould holders 11. These mould holders 11 can, depending on the type of stand part to be produced (in the present instance the stand part 10 comprises a stem with base plate), be designed as two-part or three-part hinged moulds which can be inserted respectively into the moulding units 6.

Figure 2:
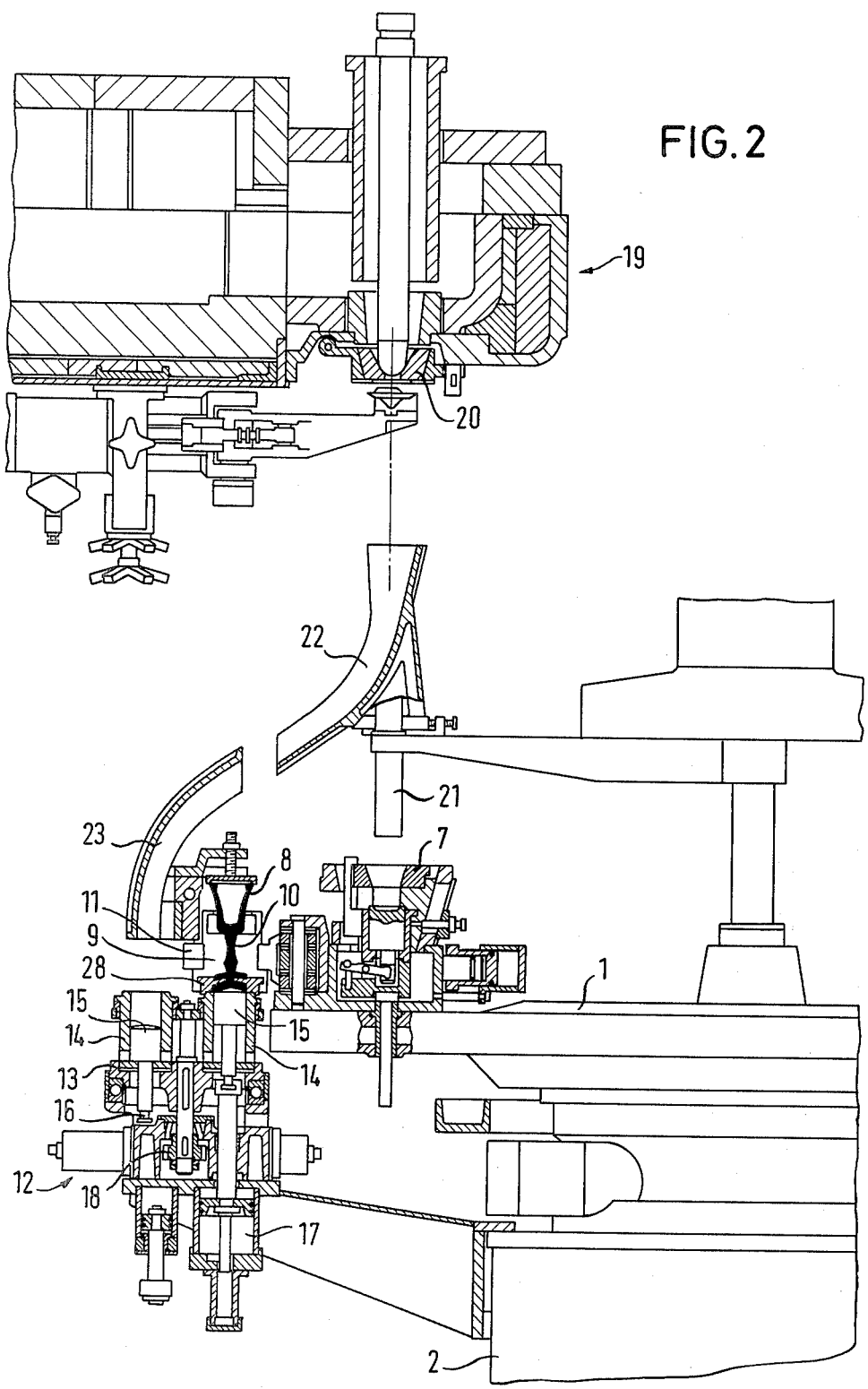
FIG. 2 is a detached sectional elevation through the feed station of the apparatus of FIG. 1 showing the injection device as well as the glass feeder arranged thereabove.

As emerges from FIG. 2, fastened to the machine base, in the region of a feed station II (see FIG. 1), is an injection unit 12, which has a rotary plate 13, which can be swung to and fro, having two collecting receptacles 14. These collecting receptacles 14 are arranged so as to be staggered with respect to one another by 180° on a partial circle on the rotary plate 13. They have respective injection plungers 15, each of which is shaped, at its lower end, with an annular groove 16, which can be coupled to a pressing device 17.

The rotary plate 13 can be swung in pendulum fashion, to and fro, through an angle of 180° by a drive 18. As can be seen in FIG. 2, arranged above the feed station II is a feeder 19 which, at predetermined intervals, ejects successive drops of molten glass (so-called glass gobs) of predetermined size, by way of an outlet opening 20. The position of this glass feeder 19 is identified in FIG. 1 with dot-dash lines.

A glass gob ejected by the feeder 19 passes either via a fall tube 21 (FIGS. 1 and 2) into the press mould 7 or via drop guide channels 22 and 23, arranged swingably under the outlet opening 20, into the collecting receptacle 14, present outside the periphery of the rotary table 1, of the injection unit 12.

As emerges from FIG. 1, the apparatus in accordance with the invention has, apart from the feeding and injecting station II, a pressing station III which is staggered relative thereto by an angle of 80° in the clockwise direction, as well as a removal and transposition station IV which is staggered by an angle of 120° relative to the pressing station III in the clockwise direction.

Figure 3:
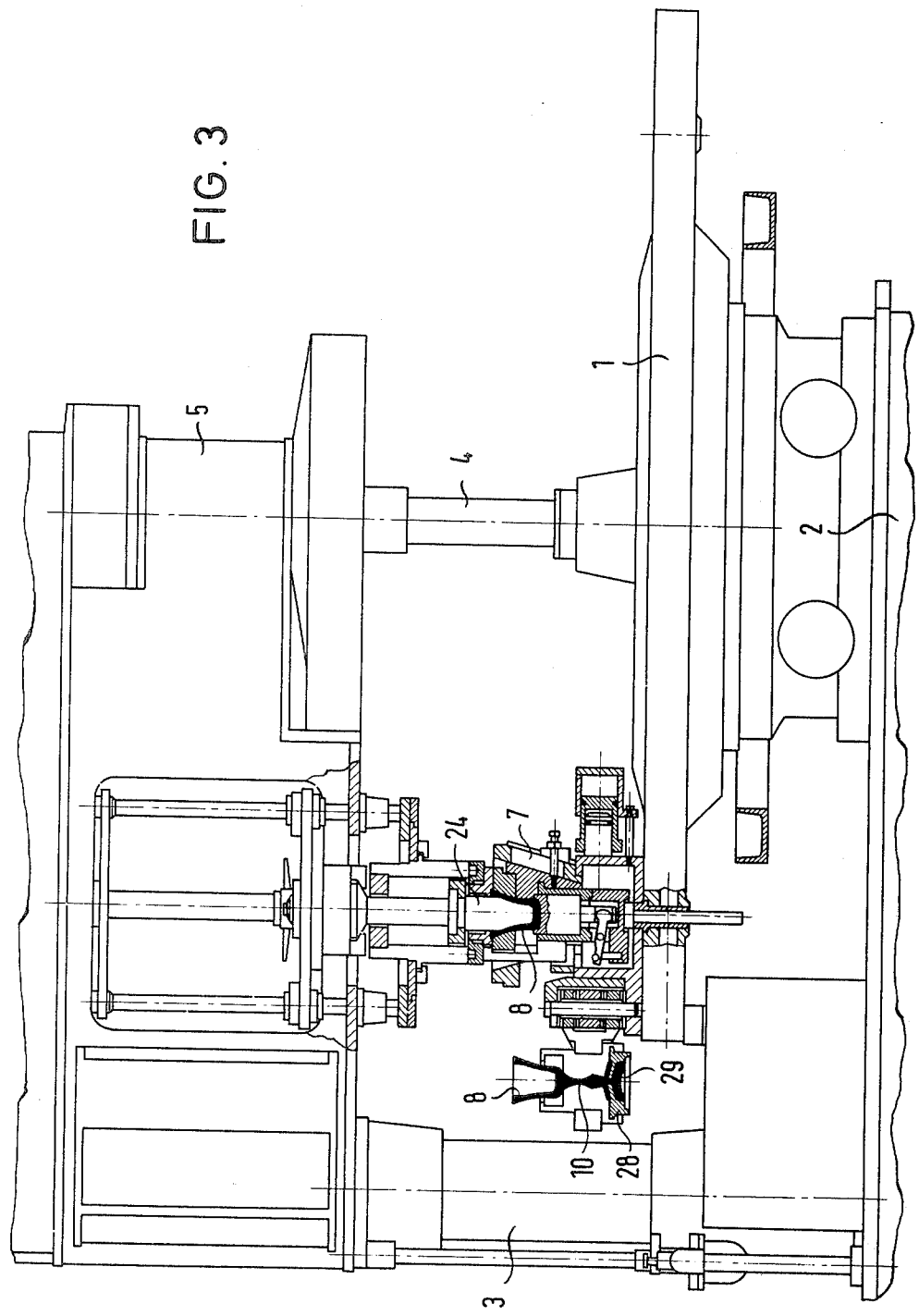
FIG. 3 is a detached vertical section through the press station for the receptacle part of the apparatus of FIGS. 1 and 2.

The pressing station III has, as can be seen in FIG. 3, a press die 24 which can be moved up and down and which has a pressing ring. The removal and transposition station IV in turn has, as can be seen from FIG. 4, two gripper systems 25, 26 which can be moved up and down on cylinders and which can be moved radially to and fro on a transverse 27.

The rotary table 1 has, on its underside, a flat toothing, not shown in the drawings, for the accurate positioning in the individual stations. The rotary table 1 is therefore raised, prior to each switching movement, out of the flat toothing and, after swinging through an angle of 80°, is lowered into engagement with the toothing once more.

As can be seen from FIG. 2 the injection mould 9 is equipped with an unsplit ring 28 which encloses a receiving space and which can, upon the lowering of the rotary table 1, be brought with its underside in sealing engagement with the upper edge of the respective collecting receptacle 14 lying under the injection mould. The reception space of the ring 28 is, therefore, of such dimensions that, as will be described in more detail later, it can receive the residual glass tablet 29 which remains after completion of the injection step (see FIGS. 2 and 3).

The mode of operation of the illustrated form of the apparatus in accordance with the invention is as follows:

A glass gob ejected from the glass feeder 19 passes via the fall tube 21 into the interior of the press mould 7, whereupon this latter is indexed in the clockwise direction through an angle of 80° into the pressing position III. In this pressing position, as shown in FIG. 3, the press die 24 with pressing ring is run into the press mould 7 and in this way the receptacle part in the present instance a glass goblet bowl, is produced.

After the run-out of the press die 24 and the pressing ring, the press mould 7 with the finished goblet glass receptacle part 8, is by swinging through an angle of 80° run through five cooling stations, in order finally to pass, in a seventh partial step, into the transposing station IV (FIG. 1), In the transposing station IV (see FIG. 4), the goblet glass receptacle part, which has cooled down in the meantime, is released by axial opening of the press mould 7, so that the gripper system 25 can grasp the top part or receptacle part 8 of the goblet glass and can withdraw it upwardly out of the press mould. From this position, the top part of the goblet glass is run radially outwards over the closed injection mould 9 and, subsequent thereto, is inserted in a vertical downward movement into the injection mould 9.

After indexing by an angle again 80°, the top part 8 of the goblet glass, received in the injection mould 9, reaches a waiting station which is necessary in order, at this stage, to cool the empty press mould 7 and, in the case of a segmented mould, to check that it is in its closed state. Up to this point in time, the glass gobs, ejected from the feeder 19 and intended for the injection unit 12, have been carried off via a removal channel (not shown in the drawings). Now, at the start of this standstill phase, a glass gob ejected from the feeder 19 is fed, via the drop guide channels 22 and 23, into the external collecting receptacle 14 of the injection unit 12. At the end of this standstill phase, a further glass gob, ejected from the feeder 19, as occurred in the preceding standstill phase of the first revolution—is fed, via the fall tube 21, into the press mould 7. In the indexing movement of the rotary table 1 which follows, this standstill phase, and in which the first completed goblet glass top part 8 received in the injection mould 9 reaches the feed station II, the collecting receptacle 14, charged in the preceding standstill phase, is swung by the rotary plate 13 via the drive 18 under the injection mould 9 supplied with the goblet glass top part 8 and, upon the lowering of the rotary table 1, is centred via the ring 27 with this mould 9. In the standstill phase which now follows, the stem with the base plate is injection moulded by the plunger 15, so as to be united with the goblet glass top part 8.

Also during this standstill phase, at the start a glass gob has been conducted via the drop guide channels 22 and 23 into the now external empty collecting receptacle 14 and a further glass gob passes from the feeder 19 via the fall tube 21 into the press mould 7. In this way, in each successive standstill phase, in each case, a glass gob is conveyed at the start of the standstill phase to the respective external collecting receptacle 14, the respective empty press mould 7 is charged via the fall tube 21 and a stem with base plate is injection moulded onto the goblet glass top part arranged in the injection mould 9. At the same time, during each standstill phase, a goblet glass top part 8 is produced at the pressing station III (FIG. 3).

Figure 4:
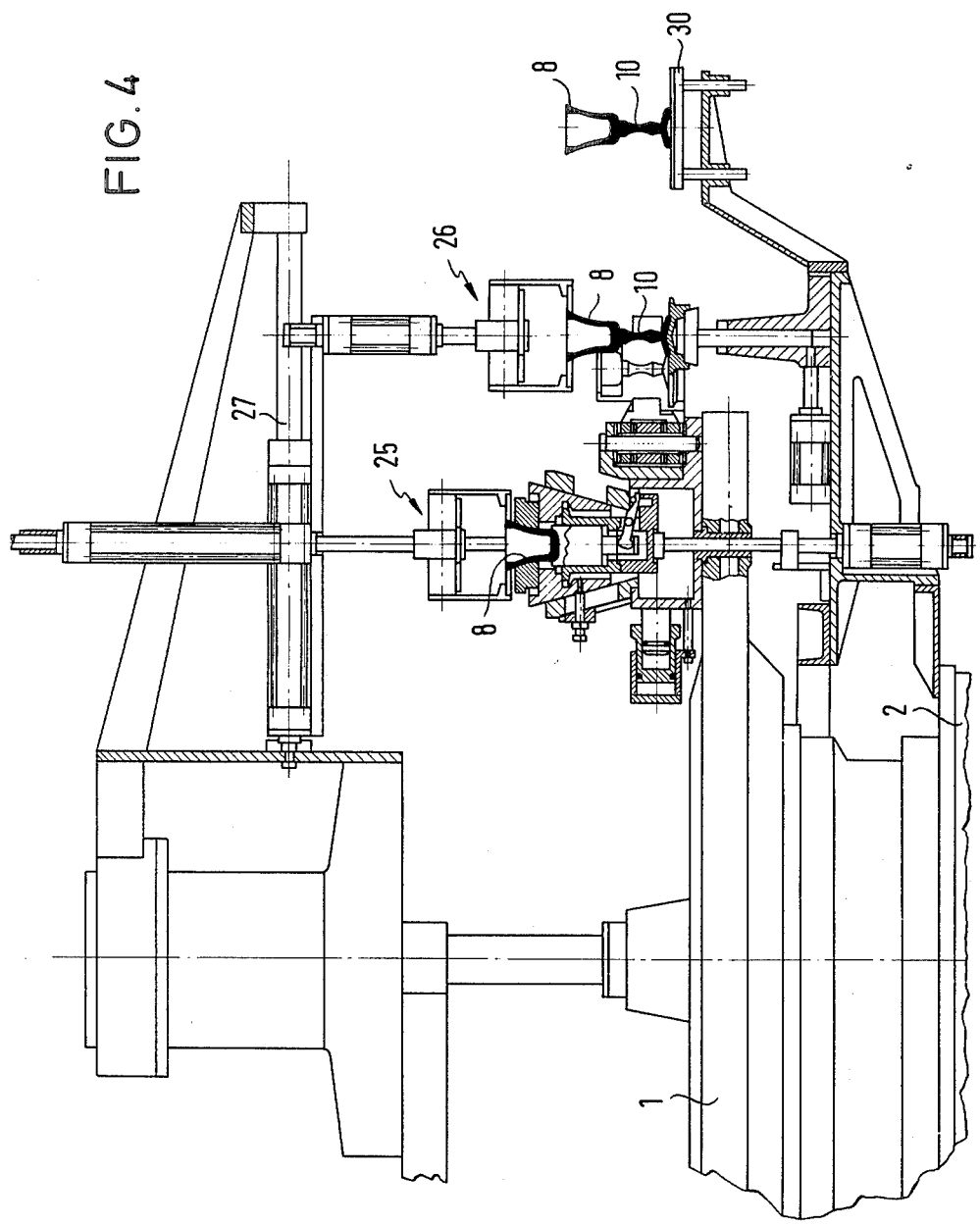
FIG. 4 is a vertical section through the removal and transposing station of the apparatus.

In the stations which follow on the feed station II, now the finished goblet glass is separated from the residual glass tablet 29 which has remained in the interior of the ring 27, and is removed, after cooling, at the removal station IV, from the opened injection mould by the gripper system 26 and is set down on a set-down plate 30 (see FIG. 4). From this set-down plate 30 the finished goblet glass passes, via a belt conveyor 31 (FIG. 1), to a cooling oven (not shown).

We claim:

1. A method of producing a glass vessel consisting of a receptacle part and a stand part, in which the receptacle part is produced on a rotary table in a pressing operation and subsequently the stand part is formed by an injection device and in so doing is united with the receptacle part, characterised in that a mould for the receptacle part is charged in free drop fall by a glass feeder, and in that the receptacle part, after pressing and cooling, is transposed onto an injection mould for the stand part, which injection mould is integrated into the rotary table for the receptacle part, and in that the injection device for the stand part is charged from the glass feeder by way of a drop guide channel.

2. A method as claimed in claim 1, characterised in that the drop fall for the receptacle part is effected at the end of a standstill phase of the rotary table for the pressing and injection process, and charging of the injection device via the drop guide channel is effected at the start of this standstill phase.

3. A method as claimed in claim 1 characterised in that, in the course of the first two revolutions of the rotary table, the receptacle part is produced, cooled and brought over the injection mould for the forming and uniting therewith of the stand part, and in that, in the course of two further revolutions of the rotary table, the stand part is moulded on and cooled, and the glass vessel is removed.

4. A method as claimed in claim 2, characterised in that the injection mould for the stand part is arranged on the rotary table radially outside the press mould for the receptacle part and is charged by way of a collecting vessel, arranged radially outside the injection mould and swingable under the injection mould, for the glass gob.

5. Apparatus for producing a glass vessel consisting of a receptacle part and a stand part, comprising a rotary table having press moulds, adapted to be charged in free drop fall from a glass feeder, for the production of the receptacle parts, characterised in that injection moulds for the stand parts are arranged on the rotary table beside the press moulds for the receptacle parts, and in that at least two collecting vessels are provided in the region of a feed station, each said collecting vessels having an injection plunger, which plungers are coupled to one another and can be swung under the successive injection moulds after charging with injection-mould glass gobs.

6. Apparatus as claimed in claim 5, characterised in that each injection mould is arranged at a small distance radially beside the respective press mould outside the edge of the rotary table.

7. Apparatus as claimed in claim 6 characterised in that the collecting vessels are arranged at a small spacing on a rotary plate.

8. Apparatus as claimed in claim 6, characterised in that the table is raisable and lowerable and is adapted to be brought into engagement with a spur toothing, which is arranged on its underside.

9. Apparatus as claimed in claim 8, characterised in that arranged on the underside of the injection mould is an unsplit ring which encloses a receiving chamber and which can be engaged by its underside sealingly with the upper edge of the follecting vessel.

* * * * *